(12) United States Patent
Yang et al.

(10) Patent No.: US 12,136,255 B2
(45) Date of Patent: Nov. 5, 2024

(54) DYNAMIC, CONTEXTUALIZED AI MODELS (71) Applicant: NEC Laboratories America, Inc., Princeton, NJ (US)

(72) Inventors: Yi Yang, Princeton, NJ (US); Murugan Sankaradas, Dayton, NJ (US); Srimat Chakradhar, Manalapan, NJ (US)

(73) Assignee: NEC Corporation, Tokyo (JP)

( * ) Notice: Subject to any disclaimer, the term of this patent is extended or adjusted under 35 U.S.C. 154(b) by 360 days.

(21) Appl. No.: 17/577,664

(22) Filed: Jan. 18, 2022

(65) Prior Publication Data

US 2022/0230421 A1 Jul. 21, 2022

Related U.S. Application Data

(60) Provisional application No. 63/139,669, filed on Jan. 20, 2021.

(51) Int. Cl.
*G06K 9/00* (2022.01)
*G06V 10/774* (2022.01)
*H04L 67/00* (2022.01)
*H04L 67/01* (2022.01)

(52) U.S. Cl.
CPC .......... *G06V 10/7747* (2022.01); *H04L 67/01* (2022.05); *H04L 67/34* (2013.01)

(58) Field of Classification Search
CPC ................................................... G06V 10/82
See application file for complete search history.

(56) References Cited

U.S. PATENT DOCUMENTS

| | | | |
|---|---|---|---|
| 2018/0089203 A1* | 3/2018 | Soni | G06F 16/738 |
| 2018/0137406 A1* | 5/2018 | Howard | G06N 3/04 |
| 2019/0138829 A1* | 5/2019 | Gurghian | H04L 67/12 |
| 2019/0384291 A1* | 12/2019 | Michalakis | G06N 20/00 |
| 2020/0401853 A1* | 12/2020 | Xiong | G06T 7/70 |

OTHER PUBLICATIONS

Henderson, Paul, and Vittorio Ferrari. "End-to-end training of object class detectors for mean average precision." Computer Vision-ACCV 2016: 13th Asian Conference on Computer Vision, Taipei, Taiwan, Nov. 20-24, 2016, Revised Selected Papers, Part V 13. Springer International Publishing, 2017. (Year: 2017).*
He, Fei, et al. "Temporal context enhanced feature aggregation for video object detection." Proceedings of the AAAI Conference on Artificial Intelligence. vol. 34. No. 07. 2020. (Year: 2020).*
He (Year: 2020).*
Henderson (Year: 2017).*
Mullapudi et al., "Online Model Distillation for Efficient Video Inference", arXiv:1812.02699v2 [cs.CV] Jan. 27, 2020, pp. 1-14.

* cited by examiner

*Primary Examiner* — Hadi Akhavannik
(74) *Attorney, Agent, or Firm* — Joseph Kolodka (57) ABSTRACT

A method for employing a semi-supervised learning approach to improve accuracy of a small model on an edge device is presented. The method includes collecting a plurality of frames from a plurality of video streams generated from a plurality of cameras, each camera associated with a respective small model, each small model deployed in the edge device, sampling the plurality of frames to define sampled frames, performing inference to the sampled frames by using a big model, the big model shared by all of the plurality of cameras and deployed in a cloud or cloud edge, using the big model to generate labels for each of the sampled frames to generate training data, and training each of the small models with the training data to generate updated small models on the edge device.

14 Claims, 10 Drawing Sheets

Stride 510

$$T = \{Frame_i | i\%K == 0\}$$

mAP 520

$$T = \{Frame_i | \\ minmAP(small(Frame_i), big(Frame_i))) \\ K * j \leq i < (K+1) * j\}$$

Confidence 530

$$T = \{Frame_i | \\ min(confidence(small(Frame_i))) \\ K * j \leq i < (K+1) * j\}$$

DYNAMIC, CONTEXTUALIZED AI MODELS

RELATED APPLICATION INFORMATION

This application claims priority to Provisional Application No. 63/139,669, filed on Jan. 20, 2021, the contents of which are incorporated herein by reference in their entirety.

BACKGROUND

Technical Field

The present invention relates to edge-cloud environments and, more particularly, to dynamic, contextualized artificial intelligence (AI) models.

Description of the Related Art

With widely deployed video surveillance systems and fast evolving artificial intelligence (AI) techniques, lots of applications, such as facial recognition-based people identification and object detection-based traffic analytics, have been developed in various locations including airports, stadiums, highways, etc. Meanwhile, following the exponential growth of Internet-of-Things (IoT) devices and recent 5G edge cloud, edge computing has become the most popular solution for video analytics. Compared to conventional cloud deployment, researchers tend to deploy smaller models on the edge. Edge computing enables individual AI models and allows further customization of the AI models to be more dynamic and contextualized as edge computing is naturally decentralized compared to cloud computing.

SUMMARY

A method for employing a semi-supervised learning approach to improve accuracy of a small model on an edge device is presented. The method includes collecting a plurality of frames from a plurality of video streams generated from a plurality of cameras, each camera associated with a respective small model, each small model deployed in the edge device, sampling the plurality of frames to define sampled frames, performing inference to the sampled frames by using a big model, the big model shared by all of the plurality of cameras and deployed in a cloud or cloud edge, using the big model to generate labels for each of the sampled frames to generate training data, and training each of the small models with the training data to generate updated small models on the edge device.

A non-transitory computer-readable storage medium comprising a computer-readable program for employing a semi-supervised learning approach to improve accuracy of a small model on an edge device is presented. The computer-readable program when executed on a computer causes the computer to perform the steps of collecting a plurality of frames from a plurality of video streams generated from a plurality of cameras, each camera associated with a respective small model, each small model deployed in the edge device, sampling the plurality of frames to define sampled frames, performing inference to the sampled frames by using a big model, the big model shared by all of the plurality of cameras and deployed in a cloud or cloud edge, using the big model to generate labels for each of the sampled frames to generate training data, and training each of the small models with the training data to generate updated small models on the edge device.

A system for employing a semi-supervised learning approach to improve accuracy of a small model on an edge device is presented. The system includes a memory and one or more processors in communication with the memory configured to collect a plurality of frames from a plurality of video streams generated from a plurality of cameras, each camera associated with a respective small model, each small model deployed in the edge device, sample the plurality of frames to define sampled frames, perform inference to the sampled frames by using a big model, the big model shared by all of the plurality of cameras and deployed in a cloud or cloud edge, use the big model to generate labels for each of the sampled frames to generate training data, and train each of the small models with the training data to generate updated small models on the edge device.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Different machine learning models have been developed for different scenarios. Using an object detector as an example, Faster-RCNN has achieved state-of-the-art accuracy for the Common Objects in Context (COCO) dataset with high computation and large memory usage requirements due to the large number of layers and the size of weights, while MobileNet-SSD can deliver much higher performance but acceptable accuracy with a small number of layers. In the edge cloud case, to maintain the hardware cost, a small model is selected to be deployed in the edge device even with sacrificed accuracy. The large model is usually trained and deployed in the cloud environment. Some designers choose to allow a small model at the edge first to process input data and then allow the large model in the cloud to process the data if the small model cannot handle the input data well.

In one example, the frames from each of a plurality of cameras are first processed by a small model at the edge. In most cases, the detection result from the small model has enough accuracy and can be used for several applications, such as car counting. The big model may be used for a small number of frames from the edge based on different policies. For example, the exemplary methods can use the big model for one frame every second while the rest of the frames are processed by the small model. Alternatively, the big model can be used to process the frame that has detection results with low confidence using the small model. Then the result from the big model can be used to adjust the results from the small model, and therefore it can achieve better accuracy compared to using only the small model, while the bandwidth between cloud and edge is also reduced. In other words, such a hybrid approach can balance the accuracy and bandwidth usage between cloud and edge.

One trend is to specialize the small model on the edge due to several reasons. First, the small model only needs to handle a limited number of inputs since an edge device has its locality information and only processes the data coming from data nearby. Second, specialized training only uses limited data, thus improving data isolation and privacy. If a model needs to be trained with data coming from many locations, a centralized data collector needs to be built and the collector can have data privacy issues. As a comparison, specialized training only needs a small number of data, and the data privacy issue of the model in a location doesn't affect other locations. Third, the model in the edge can have different requirements for different input data. For example, a higher resolution may be needed for one camera, whereas a lower resolution may be needed for another camera. One camera can be used for car detection while another camera can be used for people detection. A unified model can have difficulty in balancing the requirements for each one. Furthermore, the small model is usually a small model with limited learning capability and cannot learn such large information. Finally, a unified model requires a longer learning time due to the large input data size and is difficult to scale, while a specialized model can be learned very quickly by distributing the learning process to multiple devices.

Figure 1:
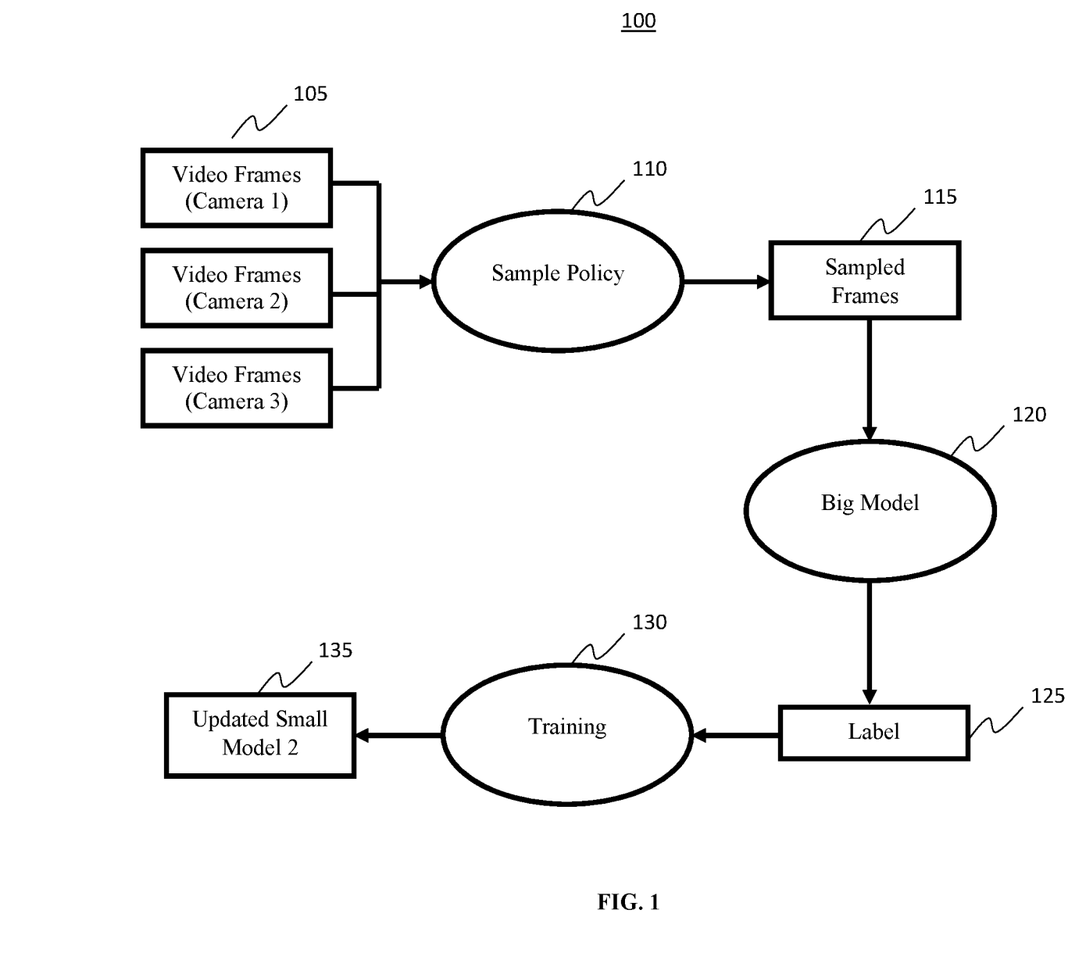
FIG. 1 is a block/flow diagram of an exemplary system for dynamic, contextualized artificial intelligence (AI) models, in accordance with embodiments of the present invention.

FIG. 1 is a block/flow diagram of an exemplary system 100 for dynamic, contextualized artificial intelligence (AI) models, in accordance with embodiments of the present invention.

The overall system 100 shows that video frames 105 from multiple cameras are used to learn and improve the small model for the multiple cameras.

The input of the system 100 is the frames 105 which are received from a video stream in real-time. The system 100 can support multiple cameras, and the number of cameras can be, e.g., over 1000. Since each camera is unique and has different requirements, a different small model is deployed for each camera, and the small model is used for inference for the camera. For example, the system 100 can detect cars from the video of one camera or can detect people from the video of another camera.

The system 100 receives frames 105 from each camera. Then, the system either uses all the frames 105 or applies a policy 110 to sample the frames 105 to reduce the number of frames. Thus, sampled frames 115 are obtained, which include a lesser number of frames than the original number of frames generated.

A big model 120 is then employed to perform the inference on the sampled frames 115 so that each frame also has the objects confirmation in the frame. The big model 120 used is a single model and is shared by all the different cameras and small models.

The frames are then labeled as shown in block 125. The generated labels 125 are then employed to train the small model, as shown in block 130, and the small model has better accuracy after training. This way, the accuracy of the small model can be improved without the need for human labeling. As a result, updated small models 135 are generated.

Figure 2:
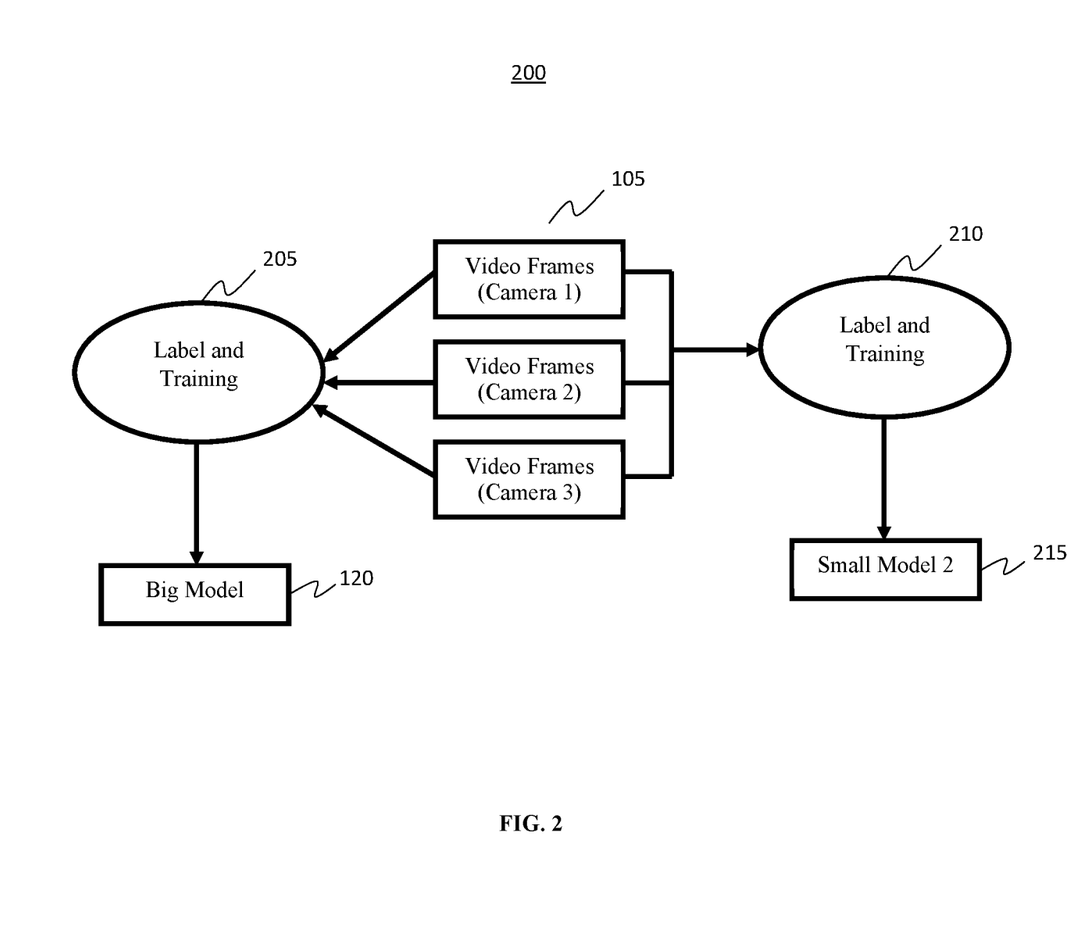
FIG. 2 is a block/flow diagram of an exemplary system initialization for AI models, in accordance with embodiments of the present invention.

FIG. 2 is a block/flow diagram of an exemplary system initialization 200 for AI models, in accordance with embodiments of the present invention.

The system 200 initializes the big and small models. The input of the system 200 is the frames 105 which are received from a video stream in real-time. The system can support multiple cameras, and the number of cameras can be, e.g., over 1000. In block 205, a small number of frames from all cameras can be taken, and human labor can be used to label these frames to generate the training data and to apply the big model training on the data to generate the big model 120.

For each camera, a small number of the video frames are collected. Then in block 210, human labor is employed to label these frames to generate the training data and apply the small model training on the data to generate a small model 215. Therefore, if three cameras are used, three small models will be employed, and one single big model is employed.

Regarding the sample policies:

The default policy is to use all the frames for training. For example, if a video streams 100 frames one by one, all of these 100 frames are to be used for the training. In this case, the system 100 sends all these frames through networks, applies the big model 120 on these frames 105 and trains the small model on these frames with the big model's results.

Regarding a stride policy, to reduce the cost, a stride is introduced to sample the training data. For example, if 20 is used as the stride, then for every 20 frames, the small model training only takes a single frame. Therefore, for 100 frames coming from a camera, the system only needs to receive five frames, apply the big model on these five frames, and train the small model using these five frames only.

Regarding the mean average precision (mAP) policy, one potential issue of the stride policy is that for each range, the first frame may not be the best one used for training. Because if the small model already performs well on one frame compared to the ground-truth which is the detection result from the big model, training on this frame doesn't provide much benefit. Therefore, the exemplary methods present a second policy based on detection accuracy of mAP used in the Common Objects in Context (COCO) dataset. The COCO dataset is a large-scale object detection, segmentation, key-point detection, and captioning dataset. The dataset includes 328K images and includes 164K images split into training (83K), validation (41K) and test (41K) sets. Precision and recall are performance metrics that apply to data retrieved from a collection, corpus or sample space. Precision is the fraction of relevant instances among the retrieved instances, while recall is the fraction of relevant instances that were retrieved. Both precision and recall are therefore based on relevance.

The exemplary embodiments calculate the mAP for each frame based on the detection result from the small model and the ground-truth using the detection result from the big model. Then the frame with the lowest mAP in the range is used for training. This way, only the worst result of the small model in a range is found and it is assumed that the training on this frame can better improve the accuracy compared to just using a random frame.

Regarding the confidence policy, since the computation of inference using the big model is very high, the last policy has a similar goal as the mAP policy but removes the computation of the big model for all the frames. In this policy, the confidence value of the detection result from the small model is used to find the frame with the worst detection result. The confidence policy first applies the detection using the small model on all the frames in a range. Since for each frame, the detection result includes multiple bounding boxes and each bounding box has a confidence number, the lowest confidence value is used to present the frame. Then, the frame with the lowest confidence value is selected and is included in the training dataset as the small model doesn't perform well on this frame. During the process, all bounding boxes whose confidence values are very low are ignored. In a deployment, applications only take detection results with a threshold, such as 0.25, as the reasonable output of the object detection. In other words, the frame that has the lowest confidence value in reasonable detection is found. For this policy, the small model is applied on all the frames, and, therefore, the bandwidth is not reduced. However, the big model only needs to be applied on the frame selected by using the small model, and the training dataset is reduced to the same scale of the stride policy.

Figure 3:
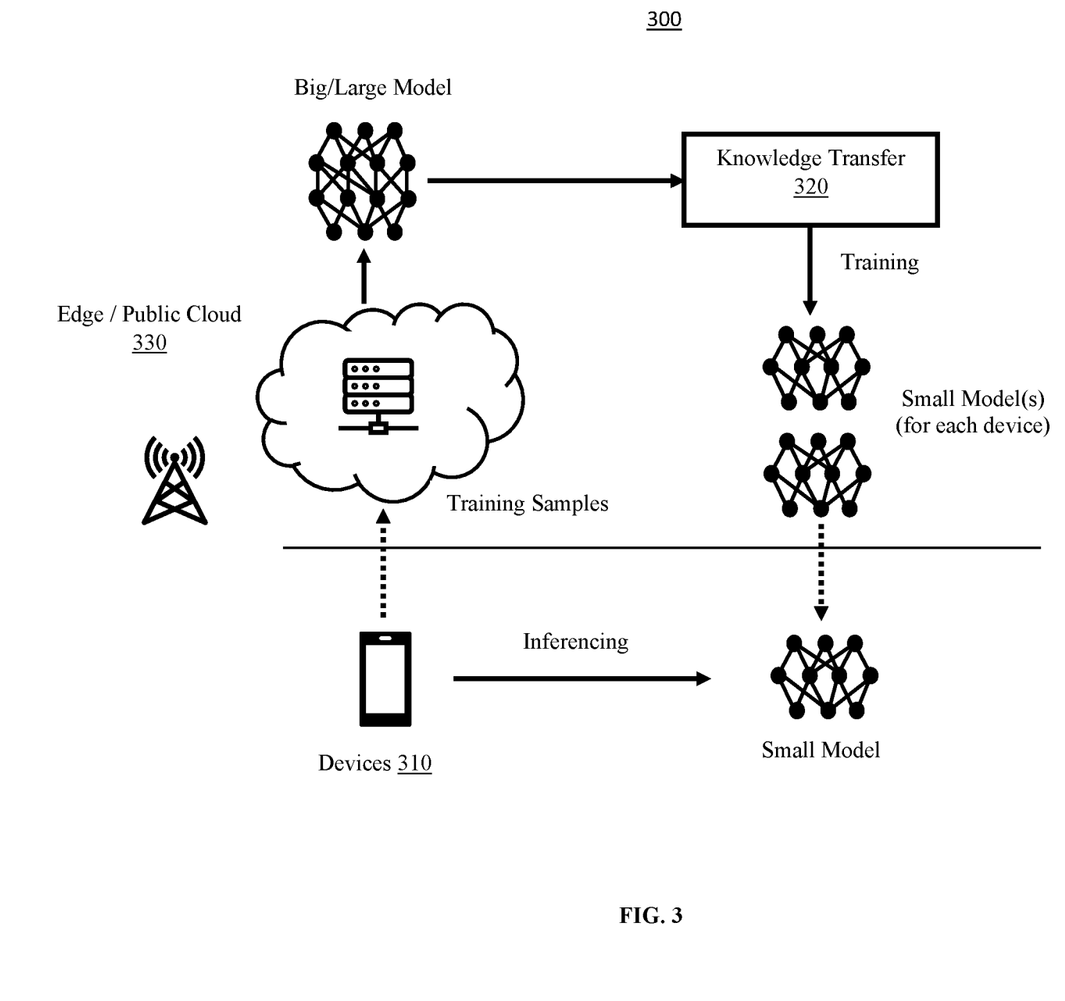
FIG. 3 is a block/flow diagram of an exemplary edge-cloud architecture with a big model and multiple small models, in accordance with embodiments of the present invention.

FIG. 3 is a block/flow diagram of an exemplary edge-cloud architecture 300 with a big model and multiple small models, in accordance with embodiments of the present invention.

The small models are different and each of them has been specialized and trained with each camera connected. However, the big model is a single unified model. The reason is that the big model has enough capability to learn all different inputs, and the cloud has enough resources for the training and inferencing.

While the small model can meet the performance requirement, the accuracy of the small model can a concern. The loss of accuracy comes from the low learning capability. First, the small model uses a lower resolution for high performance. For example, MobileNet-SSD usually uses 300 by 300 pixels as the input resolution while the Faster-RCNN uses 800 by 1333 pixels as the default input resolution. A small resolution means low accuracy due to information loss, especially for small objects. Second, the small model on the edge after specialization can only handle limited scenarios. For example, a small model trained for a camera can perform poorly after the change of some conditions, such as weather, camera angle, and focus while the big model can perform much better for different cases.

Therefore, the system 300 has both a big model and small models. The big model can deliver state-of-art accuracy but requires high computation resource running in either cloud or edge cloud environment, while the small model with lower accuracy is used to perform the inference on the device or on the edge cloud if the device doesn't have enough computation capability. The system 300 uses a single large model but different small models for different input video streams. In other words, the small model is specialized for each individual stream.

To improve the accuracy of the small models in the system 300, a semi-supervised learning approach is introduced. The device 310 will continuously upload video frames of a camera as training samples to the edge/cloud 330. Then the edge/cloud 330 generates label data using the big model inference so that knowledge can be transferred, via the knowledge transfer component 320 from the big model to the small models. Compared to knowledge distillation, the label data is the same as the label data in the ground-truth so that the AI models are treated as black boxes and model architectures and frameworks do not need to be modified. The label data of a video stream is used to train the small model deployed for the same video stream. Finally, the small model to the device is updated so that it can produce better accuracy for inference.

While the semi-supervised approach can improve the accuracy of the small models, the cost of training needs to be managed. Therefore, three polices for training samples are presented. The first policy is to collect frames based on a stride to explore the similarity among consecutive frames so that the training cost can be reduced by a scale of, e.g., 10. Then, accuracy or confidence information is used to select the best frame among a group of the frames within a stride range to improve the accuracy without increasing the training cost.

While most previous studies propose to utilize the knowledge distillation to improve the small model using the big model, the exemplary methods choose a more general way for the small model training. The approach is based on semi-supervised learning, and the big model is used to generate the label data similarly to data labeling performed by a human. Before the discussion of the approach, the model initialization as shown in Algorithm 1 is introduced. The system supports multiple camera streams and the number of cameras as noted in Algorithm 1, reproduced below.

For each camera, a small number of frames is collected before deployment and the data is manually labeled, as shown in line 4 of Algorithm 1. For example, the exemplary methods manually label around 1000 frames for each camera, and then use about 750 frames to train the model and 250 frames to evaluate the model. These labels provide a good starting point for the models.

---

Algorithm 1 Model initialization

1:     Function: Init_model{frames[1 : n]}
       INPUT: frames - frames from n cameras
       OUTPUT: small_model - small models for n cameras
       OUTPUT: big_model - the big model
2:     i ← 1
3:     while i ≤ n do
4:        labels[i] ← manual_label(frames[i])
5:        small_model[i] ← train(small_net, labels[i])
6:        i ← i + 1

-continued

| Algorithm 1 Model initialization |
|---|
| 7:     end while |
| 8:     big_model ← train(big_net, labels[1 : n]) |

For the model deployed at the edge, since each small model only works on the frames from a single camera, the small models are trained by using the labeled frames from this camera, as shown in line 5 of Algorithm 1. As a result, three different small models are generated. However, for the big model, all the labeled data from all the cameras are employed, and a single big model is generated, as shown in line 8 of Algorithm 1. It is noted that this is only necessary before the deployment, and therefore the cost for both labeling and hardware occur this one time.

Then after the deployment, each camera keeps streaming frames in the runtime and the semi-supervised learning is shown in Algorithm 2, reproduced below.

| Algorithm 2 Model update |
|---|
| 1:     Function: Update_model{frames[1 : n]}<br>       INPUT: frames - frames from n cameras<br>       INPUT: big_model - the big model<br>       OUTPUT: small_model - small models for n cameras |
| 2:     i ← 1 |
| 3:     while i ≤ n do |
| 4:         fsample ← sample(frames[i]) |
| 5:         labels[i] ← inference_label(fsample, big_model) |
| 6:         small_model[i] ← train_update( |
| 7:             small_model[i], small_net, labels[i]) |
| 8:         i ← i + 1 |
| 9:     end while |

As shown in line 5 of Algorithm 2, the big model is applied on these frames to generate detection results and the results are used as the label data. Such label data is then used to train and update each small model in lines 6 and 7 of Algorithm 2. A training policy is also presented in line 4 of Algorithm 2 to sample the training data. This way, every small model keeps learning from the big model in the runtime based on the label generated by the big model.

The exemplary approach includes several benefits. First, the exemplary approach doesn't require any changes to the existing deep learning framework. Most deep learning frameworks have been optimized to achieve the best performance for standard model training and model inferencing. The knowledge distillation requires additional changes on the training and inferencing procedure. These changes may not be highly optimized and can thus reduce the runtime performance. Using inference and training as a black box is also helpful to update the model and framework to a new version without any changes. Second, since labels are used that can be recognized and understood by a human, it gives the opportunity for people to further improve the data or add additional human labeling. Third, the semi-supervised approach has been widely used on other machine learning algorithms and is not specific to the deep learning algorithm. With the semi-supervised approach, the exemplary methods can even switch the big model or small model to a different machine learning algorithm such as histogram of oriented gradients (HOG) based on people detection.

Regarding training policies, while the exemplary approach can improve the small model, the cost of training can be significant if all frames from each camera are used for training. The cost can be broken down into several factors.

First, the frames from cameras consume lots of bandwidth. There are many different applications using an object detector. Some applications such as crowd counting which counts the number of vehicles in a frame only require very low frame-per-second (FPS) for good results, while other applications like vehicle speeding need a high FPS due to the usage of the track. Then for applications with the low FPS, all the frames from a camera do not need to be received. In other words, the system streaming lots of frames can only be used for training purposes, thus increasing the bandwidth requirement. Second, the cost of labeling using the big model is also not eligible. Compared to the case that only a small model is used to perform inference on each frame, the cost to generate the label using the big model on each frame can be increased by a scale factor of, e.g., 10. Third, the number of frames used for training is linear to the training time. Several policies are presented to reduce the frames for training and their impact on the different costs, including bandwidth, inference, and training.

The default policy is to use all the frames for training. For example, if a video streams 100 frames one by one, all 100 frames are used to conduct the training. In this case, the system sends all these frames through networks, applies the big model on these frames and trains the small model on these frames with the big model's results.

In order to reduce the cost, a stride is used to sample the training data. For example, if 20 is used as the stride, then for every 20 frames, the small model training only takes a single frame. Therefore, for 100 frames received from a camera, only five frames need to be received, the big model is applied on these five frames, and the small model is trained using these five frames only. As shown in Equation 1 below, T is the training dataset and K is the value of the stride.

$$T = \{Frame_i | i \% K == 0\} \quad (1)$$

T only includes the frames whose ids are the multiple of K. In other words, the frames are partitioned into multiple ranges and each range has K frames. In turn, it reduces the bandwidth usage, big model inference, and training data. One potential approach is to find the best number for the stride and modify the stride in the runtime which can reduce or increase the cost for a camera in the runtime. In the deployment, a fixed hardware cost for each camera is preferred to simplify the deployment. As a result, only a reasonable stride needs to be selected before the deployment. Besides the advantages of cost, this policy considers temporal locality and can cover different scenarios over time for accuracy purposes.

One potential issue of the stride policy is that for each range, the first frame may be not the best one used for training. Because if the small model already performs well on one frame compared to the ground-truth which is the detection result from the big model, training on this frame doesn't provide much benefit. Therefore, a second policy is presented based on detection accuracy of mAP used in the COCO dataset.

In Equation 2, reproduced below, first for frames in each range between [K*j, (k+1)*j], the mAP is calculated for each frame based on the detection result from the small model and the ground-truth using the detection result from the big model.

Then the frame with lowest mAP in the range is used for training.

$$T = \{Frame_i | \min(mAP(small(Frame_i), big(Frame_i))) | K*j \leq i < (K+1)*j\} \quad (2)$$

This way, only the worst result of the small model in a range is found and it is assumed that the training on this frame can better improve the accuracy compared to just using a random frame. For this policy, the small model needs all frames and therefore the bandwidth is not reduced. The small model and the big model need to be applied on every frame as the mAP computation needs both the detection and ground-truth. However, the training dataset has been reduced to the same scale of the stride policy.

Since the computation of inference using the big model is very high, the last policy has a similar goal as the mAP policy but removes the computation of the big model for all the frames. In this policy, the confidence value of the detection result from the small model is used to find the frame with the worst detection result, as shown in equation 3, reproduced below.

$$T=\{Frame_i | \min(confidence(small(Frame_i))) | K*j \le i < (K+1)*j\} \quad (3)$$

The confidence policy first applies detection using the small model on all the frames in a range. Since for each frame, the detection result includes multiple bounding boxes and each bounding box has a confidence number, the lowest confidence value is used to present the frame. Then the frame with the lowest confidence value is selected and is included in the training dataset as the small model doesn't perform well on this frame. During the process, all the bounding boxes whose confidence values are very low are ignored. Thus, the frame that has the lowest confidence value in reasonable detection is found. For this policy, the small model is applied on all the frames and therefore the bandwidth is not reduced. However, the big model only needs to be applied on the frame selected by using the small model, and the training dataset is reduced to the same scale of the stride policy.

The cost of the different policies is compared in Table 1, reproduced below. In Table 1, the cost is shown based on a stride including K frames.

TABLE 1

| Policy | Bandwidth from camera | Small Inference | Big Inference | Train |
|---|---|---|---|---|
| Default | K | 0 | K | K |
| Stride | 1 | 0 | 1 | 1 |
| mAP | K | K | K | 1 |
| confidence | K | K | 1 | 1 |

The default policy means all the frames are used for training. Since there are K frames in a stride, the cost of bandwidth, big inference for ground-truth and training are K. The stride policy reduces the cost of everything to 1 since it always takes the first frame of one stride. Another stride, mAP, reduces the training to 1, but still needs K for other costs. Finally, using the confidence stride, the big inference can further be reduced to 1. In Table 1, the small model inference is usually not an issue since the inference result is useful for applications and its cost is much smaller compared to the big model inference and training process.

Regarding the system deployment on the edge-cloud, the exemplary methods can use R-50-FPN as the big model and MobileNetSSD as the small model. The R-50-FPN is based on Resnet and Faster RCNN on top of maskrcnnbenchmark, detectron, and PyTorch. MobilenetSSD is a lightweight object detection model.

The hardware of the edge has a CPU of Intel i9-9900k with 6 cores running up to 5.00 GHz and 32 GB memory, and a GPU of RTX 2080 with 8 GB memory and 10.07 TFlops computation power. The operating system is Ubuntu 16.04, and the training and inference have been done in NVIDIA docker v2.03 with CUDA 10 and CUDNNv7.

The hardware of the device used is Nvidia TX2 which has 8 GB ram shared by CPU and GPU. The GPU has 256-cores and the CPU include a dual-Core NVIDIA Denver 2 64-Bit CPU and a quad-core ARM® Cortex®-A57 MPCore. In the deployment, the quad-core is only used.

The big model is used on the edge and the small model is supported on both the edge and the device. As shown in Table 2, reproduced below, the training cost of big model is very high, and the training is performed only for the initial time.

TABLE 2

| Parameter | Big model on edge | Small model on edge | Small model on device |
|---|---|---|---|
| Training memory | 5.9 GB | 4.8 GB | 6 GB |
| Training batch size | 8 | 16 | 16 |
| Training time (s/im) | 0.270 | 0.031 | 0.143 |
| Inference Memory | 1.3 GB | 0.8 GB | 1.3 |
| Inference time (s/im) | 0.031 | 0.025 | 0.056 |
| Learning rate | 0.005 | 0.0005 | 0.0005 |
| Input size (MOT20) | 1333 × 800 | 300 × 300 | 300 × 300 |
| Input size (Vehicle) | 800 × 480 | 300 × 300 | 300 × 300 |
| Epoch | 160 | 120 | 120 |

Figure 4:
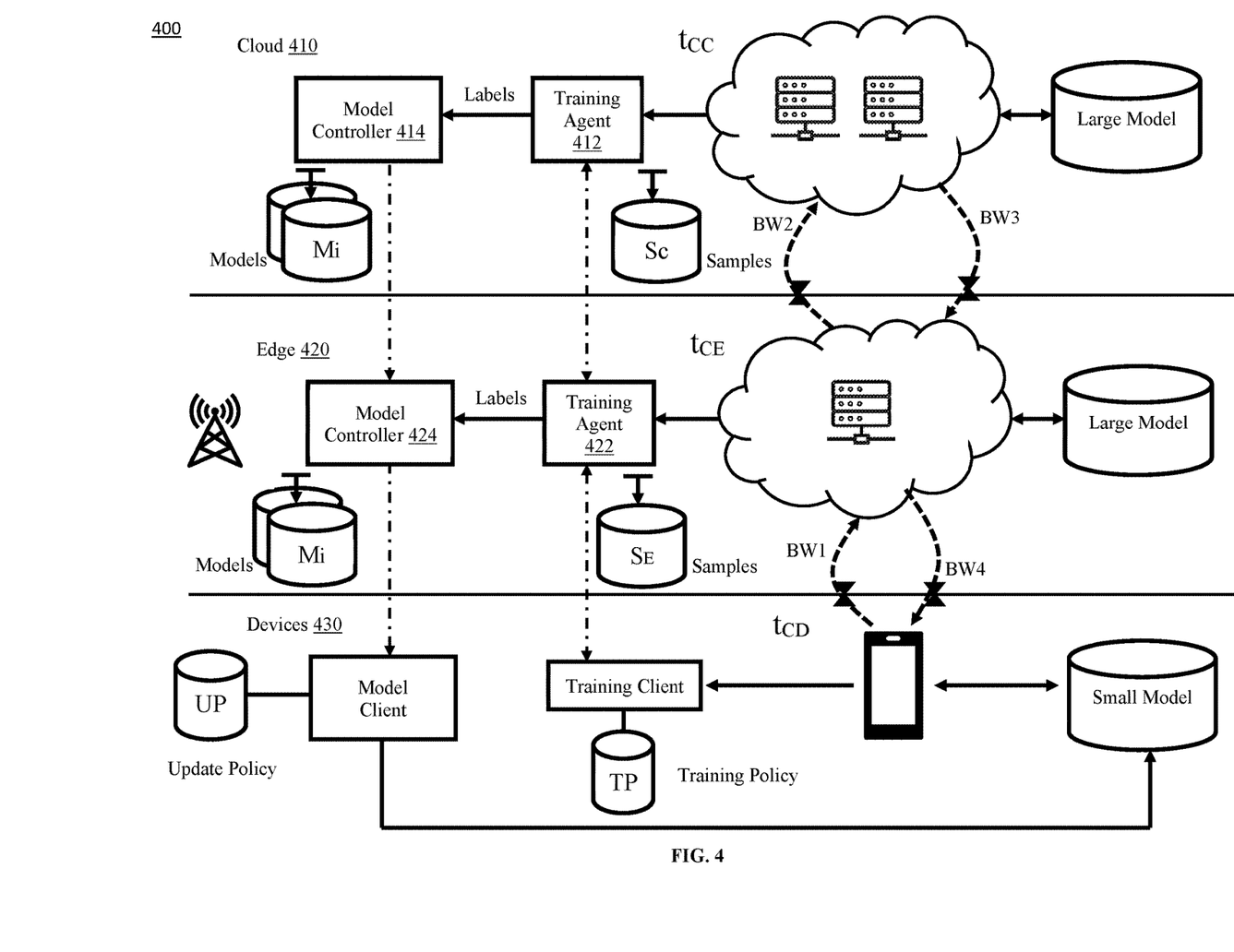
FIG. 4 is a block/flow diagram of an exemplary training setup, in accordance with embodiments of the present invention.

FIG. 4 is a block/flow diagram of an exemplary training setup, in accordance with embodiments of the present invention.

The system 400 includes a cloud 410, an edge 420, and a device 430. The cloud 410 has a high capability but is far away from the data stream. The edge 420 has a high bandwidth to the data stream but with a higher cost for hardware compared the cloud 410. The device 430 is either attached or not attached to the source of data stream which is usually a camera. For example, a device 430, like a tablet, has both a camera and a processor for computation while the device has only processors like Nvidia TX2, taking a video stream for a camera. As shown in the deployment, there are three possible different setups for the training process, that is, cloud training, edge training, and device training.

Regarding cloud training, a training client is presented on the edge and the training client collects frames depending on the different approaches. Then the cloud 410 has a training agent 412 to receive the frames from the training client, and the training agent 412 generates label data from these frames. A model controller 414 uses the frames with labels to train a specialized local model, and then update it to the local device. Since this approach requires bandwidth between device and edge to cloud and cannot preserve the privacy, such approach is not pursued.

Regarding edge training, similarly to cloud training, a training client is presented in the device. The edge 420 has a training agent 422 and a model controller 424. The cost of computation and bandwidth can be found at Table 1, reproduced above, except the bandwidth usage between the edge and the device for training. If a frame of 300×300 is about 10 Kbytes, a camera has 20 FPS, and a stride of 20 is used, then bandwidths of different policies between device and edge are 200 kb/s for Default, 10 kb/s for Stride, 200 kb/s for mAP, and 10 kb/s for Confidence. The mAP policy needs to use the edge to apply the big model for all the frames to calculate mAP values, while the confidence policy only needs to send the frames that have been selected based on confidence value to edge. Therefore, the bandwidth usage between the edge and device is minimized for both interval and confidence policies but the interval policy doesn't need the inference on all the frames.

Regarding device training, this approach trains the model on the device. Since the exemplary methods already use the device for inference, it is only possible to do training if the device is idle in some cases. For example, a camera is only used during the daytime so the device of the camera can be used for training during the nighttime. In this case, the edge is only used for inference of the big model to generate the label data. The same bandwidth requirement as the edge training is used due to the big model inference. However, the training happens on the device.

In summary, the exemplary methods introduce a system to learn dynamic and contextualized AI models in the edge. A semi-supervised approach is first provided to train individual small models on the edge from the big model in the cloud to improve the accuracy of these small models. Then several policies are developed to reduce the training datasets to reduce the training cost.

Moreover, the exemplary methods introduce a big model deployed in the cloud or the cloud edge and a small model deployed in edge devices used to inference video frames for a specific camera. The big model is used to generate labels from these video frames. Video frames from the camera are used to train and update the small model on the edge device. The small model is improved by training the video frames from the camera worked on without the need for labeling by a human. The exemplary embodiments present several policies to reduce the training cost. The default policy uses all video frames for training and has a high cost. A stride policy proposes to sample the video frames by using a stride so that only one frame among frames in a range is used for training. Each range contains 10 frames if the stride value is 10. A mAP policy uses accuracy results by comparing the small model detection result to the big model detection results to select the best frame for training among the frames in multiple frames. A confidence policy detects confidence values to select the best frame for training among the frames in multiple frames.

Figure 5:
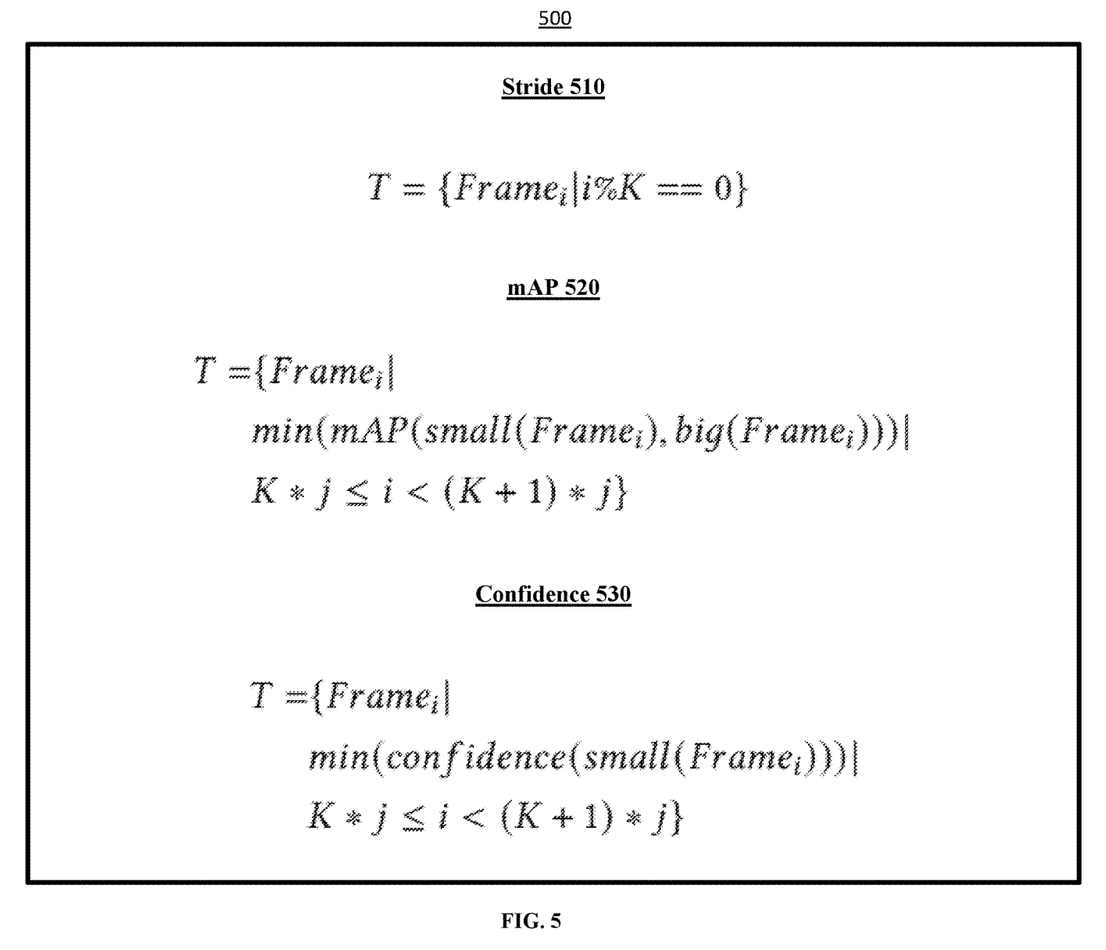
FIG. 5 is a block/flow diagram of exemplary equations for different sampling policies when employing a semi-supervised learning approach to improve accuracy of a small model on an edge device, in accordance with embodiments of the present invention.

FIG. 5 is a block/flow diagram of exemplary equations for different sampling policies when employing a semi-supervised learning approach to improve accuracy of a small model on an edge device, in accordance with embodiments of the present invention.

Equations 500 include a training dataset for stride 510, a training dataset for mAP 520, and a training dataset for confidence 530.

Figure 6:
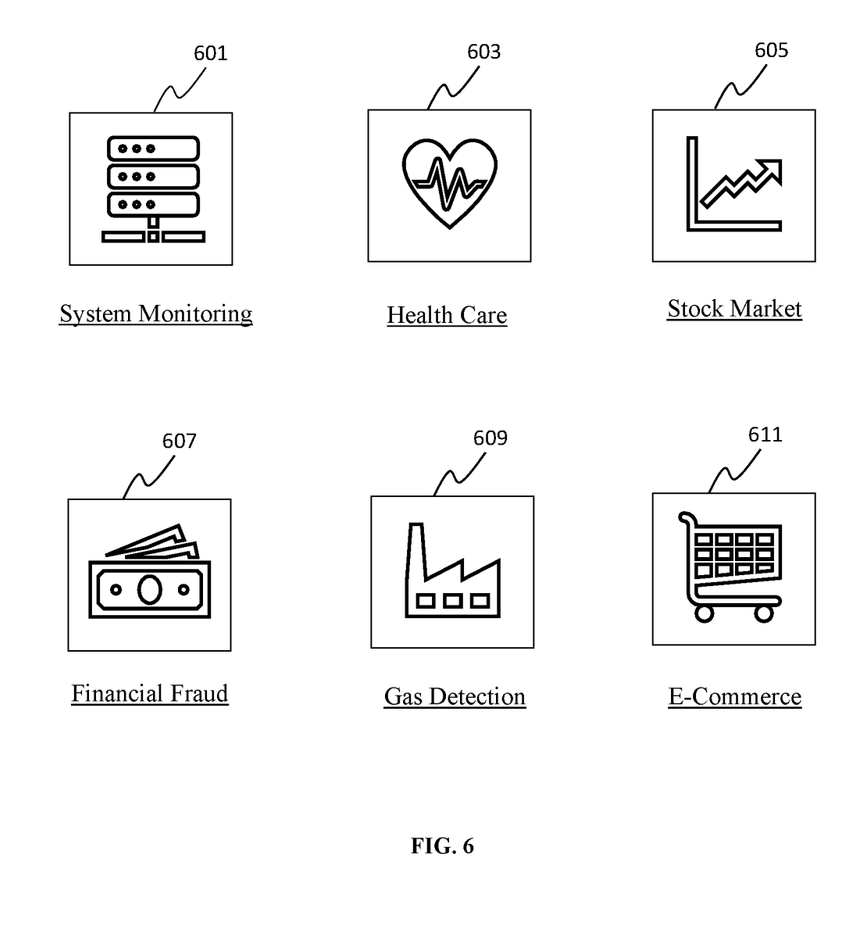
FIG. 6 is a block/flow diagram of an exemplary practical application for employing a semi-supervised learning approach to improve accuracy of a small model on an edge device, in accordance with embodiments of the present invention.

FIG. 6 is a block/flow diagram of an exemplary practical application for employing a semi-supervised learning approach to improve accuracy of a small model on an edge device, in accordance with embodiments of the present invention.

Practical applications for learning and forecasting trends in multivariate time series data can include, but are not limited to, system monitoring 601, healthcare 603, stock market data 605, financial fraud 607, gas detection 609, and e-commerce 611. The time-series data in such practical applications can be collected by sensors 710 (FIG. 7).

Figure 7:
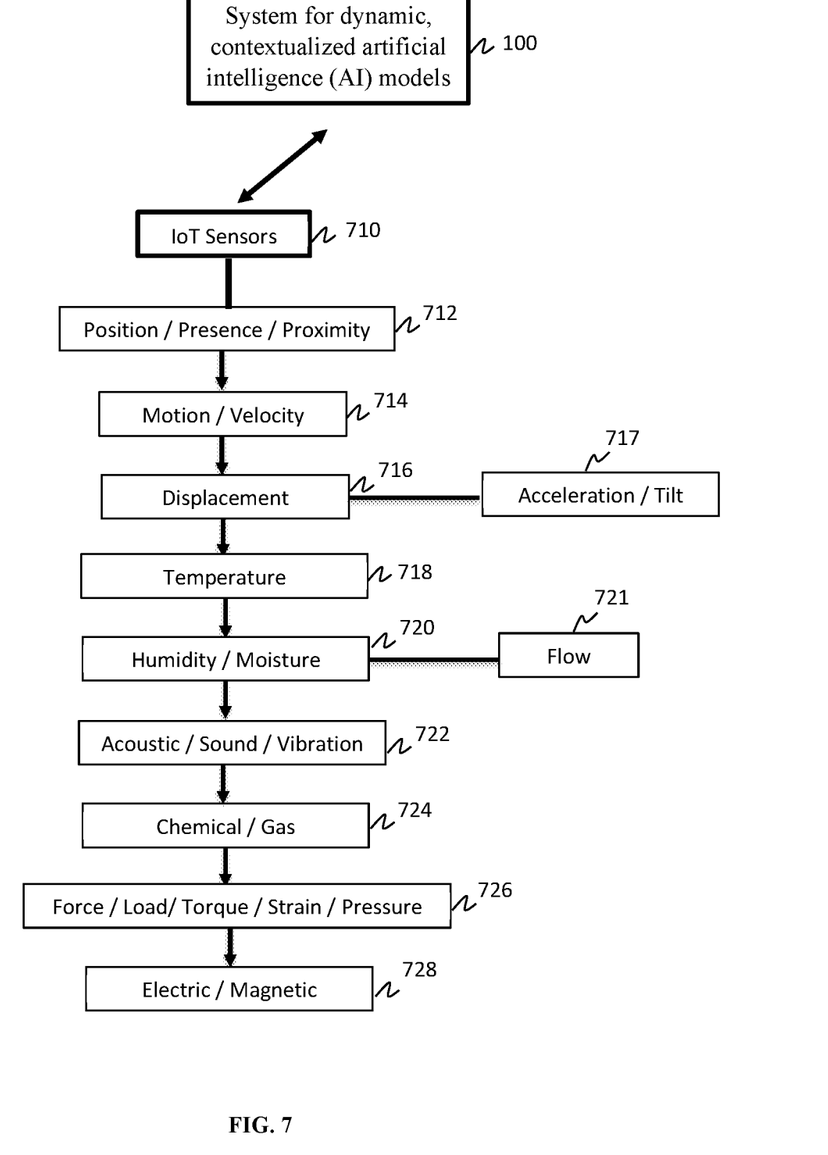
FIG. 7 is a block/flow diagram of exemplary Internet-of-Things (IoT) sensors used to collect data/information for employing a semi-supervised learning approach to improve accuracy of a small model on an edge device, in accordance with embodiments of the present invention.

FIG. 7 is a block/flow diagram of exemplary Internet-of-Things (IoT) sensors used to collect data/information for employing a semi-supervised learning approach to improve accuracy of a small model on an edge device, in accordance with embodiments of the present invention.

IoT loses its distinction without sensors. IoT sensors act as defining instruments which transform IoT from a standard passive network of devices into an active system capable of real-world integration.

The IoT sensors 710 can communicate with the system 100 for dynamic, contextualized artificial intelligence (AI) models to process information/data, continuously and in in real-time. Exemplary IoT sensors 710 can include, but are not limited to, position/presence/proximity sensors 712, motion/velocity sensors 714, displacement sensors 716, such as acceleration/tilt sensors 717, temperature sensors 718, humidity/moisture sensors 720, as well as flow sensors 721, acoustic/sound/vibration sensors 722, chemical/gas sensors 724, force/load/torque/strain/pressure sensors 726, and/or electric/magnetic sensors 728. One skilled in the art can contemplate using any combination of such sensors to collect data/information for input into the system 100 for dynamic, contextualized artificial intelligence (AI) models for further processing. One skilled in the art can contemplate using other types of IoT sensors, such as, but not limited to, magnetometers, gyroscopes, image sensors, light sensors, radio frequency identification (RFID) sensors, and/or micro flow sensors. IoT sensors can also include energy modules, power management modules, RF modules, and sensing modules. RF modules manage communications through their signal processing, WiFi, ZigBee®, Bluetooth®, radio transceiver, duplexer, etc.

Moreover, data collection software can be used to manage sensing, measurements, light data filtering, light data security, and aggregation of data. Data collection software uses certain protocols to aid IoT sensors in connecting with real-time, machine-to-machine networks. Then the data collection software collects data from multiple devices and distributes it in accordance with settings. Data collection software also works in reverse by distributing data over devices. The system can eventually transmit all collected data to, e.g., a central server.

Figure 8:
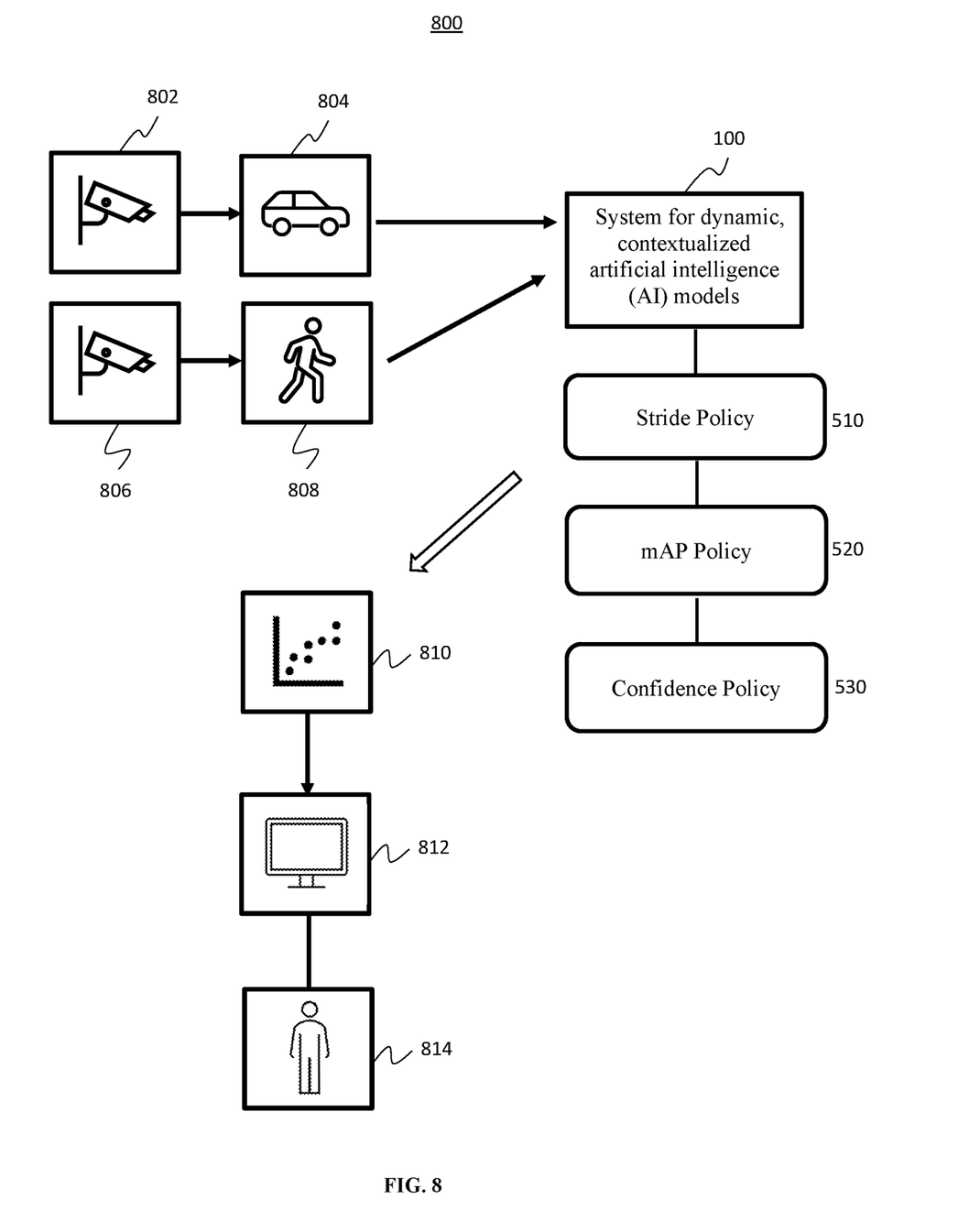
FIG. 8 is an exemplary practical application for employing a semi-supervised learning approach to improve accuracy of a small model on an edge device, in accordance with embodiments of the present invention.

FIG. 8 is a block/flow diagram 800 of a practical application for employing a semi-supervised learning approach to improve accuracy of a small model on an edge device, in accordance with embodiments of the present invention.

In one practical example, a first camera 802 detects an object, such as a vehicle 804 and a second camera 806 detects an object, such as a person 808. The objects 804, 808 are processed by the system 100 for dynamic, contextualized artificial intelligence (AI) models. The results 810 (e.g., variables or parameters or factors or features) can be provided or displayed on a user interface 812 handled by a user 814. Thus, a semi-supervised learning approach is presented to improve the accuracy of the small model on the edge device. The exemplary approach is not limited to deep learning models but can also be used for other machine learning models. The three polices 510, 520, 530 are presented to save the training cost by reducing the training dataset while maintaining accurate and acceptable accuracy.

Figure 9:
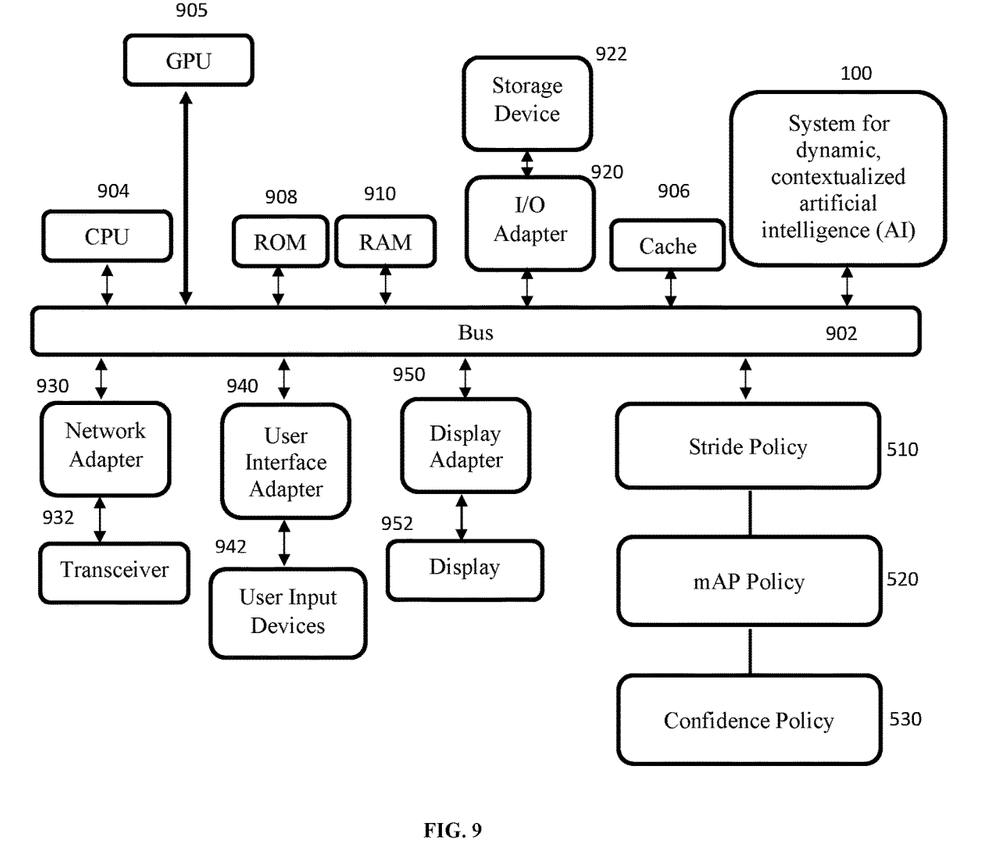
FIG. 9 is an exemplary processing system for employing a semi-supervised learning approach to improve accuracy of a small model on an edge device, in accordance with embodiments of the present invention.

FIG. 9 is an exemplary processing system for employing a semi-supervised learning approach to improve accuracy of a small model on an edge device, in accordance with embodiments of the present invention.

The processing system includes at least one processor (CPU) 904 operatively coupled to other components via a system bus 902. A GPU 905, a cache 906, a Read Only Memory (ROM) 908, a Random Access Memory (RAM) 910, an input/output (I/O) adapter 920, a network adapter 930, a user interface adapter 940, and a display adapter 950, are operatively coupled to the system bus 902. Additionally, the system 100 for dynamic, contextualized artificial intelligence (AI) models can be employed in view of a stride policy 510, a mAP policy 520, and a confidence policy 530.

A storage device 922 is operatively coupled to system bus 902 by the I/O adapter 920. The storage device 922 can be any of a disk storage device (e.g., a magnetic or optical disk storage device), a solid-state magnetic device, and so forth.

A transceiver 932 is operatively coupled to system bus 902 by network adapter 930.

User input devices 942 are operatively coupled to system bus 902 by user interface adapter 940. The user input devices 942 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 942 can be the same type of user input device or different types of user input devices. The user input devices 942 are used to input and output information to and from the processing system.

A display device 952 is operatively coupled to system bus 902 by display adapter 950.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 10:
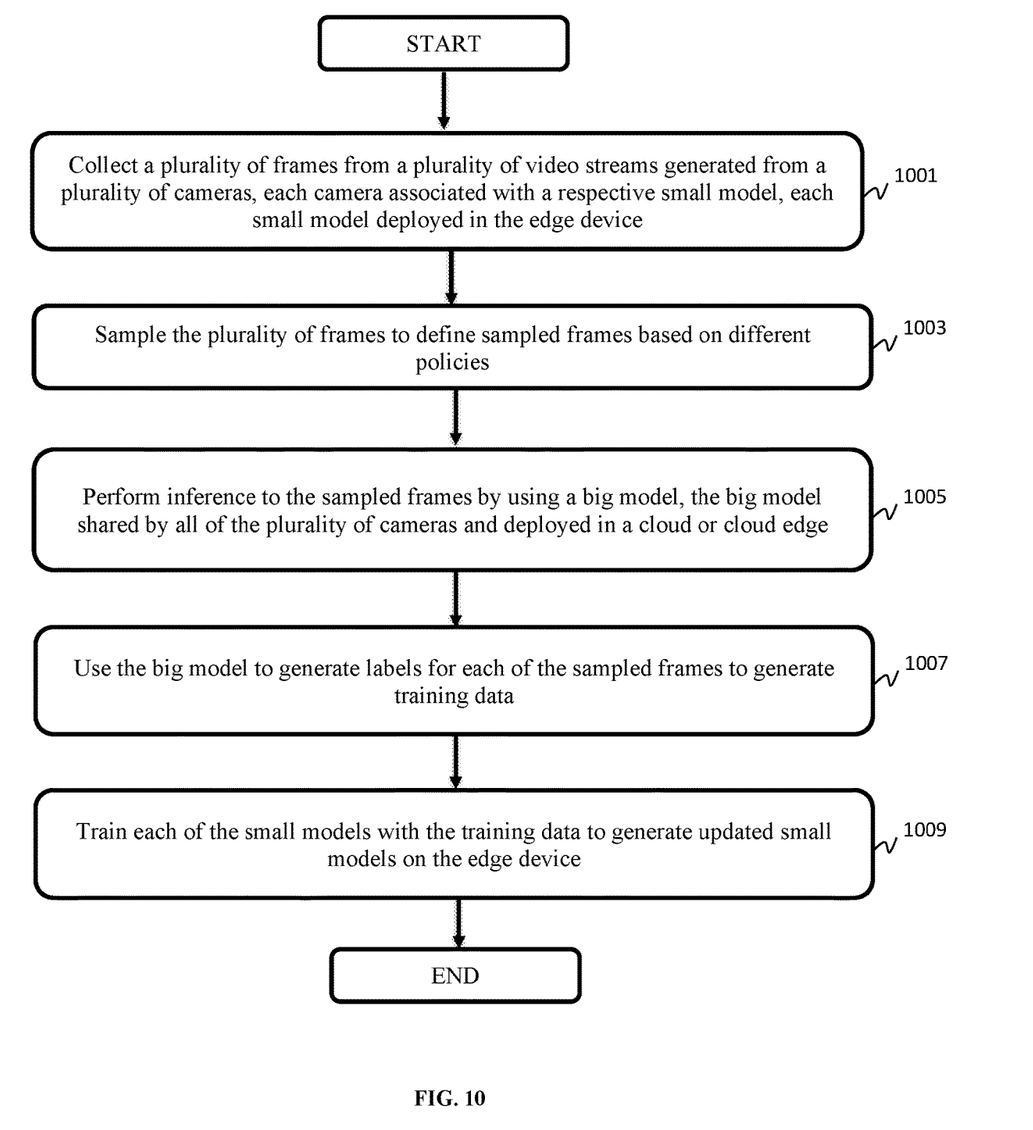
FIG. 10 is a block/flow diagram of an exemplary method for employing a semi-supervised learning approach to improve accuracy of a small model on an edge device, in accordance with embodiments of the present invention.

FIG. 10 is a block/flow diagram of an exemplary method for employing a semi-supervised learning approach to improve accuracy of a small model on an edge device, in accordance with embodiments of the present invention.

At block 1001, collect a plurality of frames from a plurality of video streams generated from a plurality of cameras, each camera associated with a respective small model, each small model deployed in the edge device.

At block 1003, sample the plurality of frames to define sampled frames based on different policies.

At block 1005, perform inference to the sampled frames by using a big model, the big model shared by all of the plurality of cameras and deployed in a cloud or cloud edge.

At block 1007, use the big model to generate labels for each of the sampled frames to generate training data.

At block 1009, train each of the small models with the training data to generate updated small models on the edge device.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like. Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for employing a semi-supervised learning approach to improve accuracy of a small model on an edge device, the method comprising:
    collecting a plurality of frames from a plurality of video streams generated from a plurality of cameras, each camera associated with a respective small model, each small model deployed in the edge device;
    sampling the plurality of frames to define sampled frames, including applying a mean Average Precision (mAP) policy that calculates a mAP for each frame based on a detection result from the small model and a ground truth using a detection result from the big model;
    performing inference to the sampled frames by using a big model, the big model shared by all of the plurality of cameras and deployed in a cloud or cloud edge;
    using the big model to generate labels for each of the sampled frames to generate training data; and
    training each of the small models with the training data to generate updated small models on the edge device using a frame with a lowest mAP in a range.

2. The method of claim 1, wherein sampling further includes applying a stride policy, the stride policy involves only using one frame from a group of frames in a range.

3. The method of claim 1, wherein the training data is reduced by sampling further includes applying a confidence policy.

4. The method of claim 3, wherein the confidence policy involves using a confidence value of a detection result from the small model to find a frame with a worst detection result.

5. The method of claim 3, wherein a frame with a lowest confidence value is used in the training data.

6. A non-transitory computer-readable storage medium comprising a computer-readable program for employing a semi-supervised learning approach to improve accuracy of a small model on an edge device, wherein the computer-readable program when executed on a computer causes the computer to perform the steps of:
    collecting a plurality of frames from a plurality of video streams generated from a plurality of cameras, each camera associated with a respective small model, each small model deployed in the edge device;
    sampling the plurality of frames to define sampled frames, including applying a mean Average Precision (mAP) policy that calculates a mAP for each frame based on a detection result from the small model and a ground truth using a detection result from the big model;
    performing inference to the sampled frames by using a big model, the big model shared by all of the plurality of cameras and deployed in a cloud or cloud edge;
    using the big model to generate labels for each of the sampled frames to generate training data; and
    training each of the small models with the training data to generate updated small models on the edge device using a frame with a lowest mAP in a range.

7. The non-transitory computer-readable storage medium of claim 6, wherein sampling includes applying a stride policy, the stride policy involves only using one frame from a group of frames in a range.

8. The non-transitory computer-readable storage medium of claim 6, wherein sampling further includes applying a confidence policy.

9. The non-transitory computer-readable storage medium of claim 8, wherein the confidence policy involves using a confidence value of a detection result from the small model to find a frame with a worst detection result.

10. The non-transitory computer-readable storage medium of claim 8, wherein a frame with a lowest confidence value is used in the training data.

11. A system for employing a semi-supervised learning approach to improve accuracy of a small model on an edge device, the system comprising:
a memory; and
one or more processors in communication with the memory configured to:
collect a plurality of frames from a plurality of video streams generated from a plurality of cameras, each camera associated with a respective small model, each small model deployed in the edge device;
sample the plurality of frames to define sampled frames, including a mean Average Precision (mAP) policy that calculates a mAP for each frame based on a detection result from the small model and a ground truth using a detection result from the big model;
perform inference to the sampled frames by using a big model, the big model shared by all of the plurality of cameras and deployed in a cloud or cloud edge;
use the big model to generate labels for each of the sampled frames to generate training data; and
train each of the small models with the training data to generate updated small models on the edge device using a frame with a lowest mAP in a range.

12. The system of claim 11, wherein sampling further includes applying a stride policy, the stride policy involves only using one frame from a group of frames in a range.

13. The system of claim 11, wherein sampling further includes applying a confidence policy.

14. The system of claim 13, wherein the confidence policy involves using a confidence value of a detection result from the small model to find a frame with a worst detection result.

* * * * *